United States Patent [19]

Akkerman et al.

[11] 4,325,402
[45] Apr. 20, 1982

[54] BIMODAL, NON-VENTING PNEUMATIC RELAY

[75] Inventors: Neil H. Akkerman, Kingwood, Tex.; Bruce D. Christensen, New Orleans, La.

[73] Assignee: Baker CAC, Inc., Belle Chasse, La.

[21] Appl. No.: 136,193

[22] Filed: Apr. 1, 1980

[51] Int. Cl.³ .............................................. F16K 11/07
[52] U.S. Cl. .............................. 137/270; 137/625.66; 137/625.69; 251/324; 251/361; 92/59
[58] Field of Search ............. 137/625.66, 270, 625.69; 92/59; 251/324, 361

[56] References Cited

U.S. PATENT DOCUMENTS

| | | | |
|---|---|---|---|
| 3,516,442 | 6/1970 | Munroe | 137/625.66 |
| 3,542,065 | 11/1970 | Holbrook | 137/625.66 X |
| 3,943,974 | 3/1976 | Connelly | 137/625.66 X |
| 4,073,466 | 2/1978 | Snyder | 137/625.66 X |
| 4,242,946 | 1/1981 | Toliusis | 92/59 |

Primary Examiner—Alan Cohan
Attorney, Agent, or Firm—Norvell, Jr. William C.

[57] ABSTRACT

A bimodal, non-venting pneumatic relay senses the presence or absence of a first pressurized fluid and controls the supply or temination of a second pressurized fluid to associated equipment. The relay includes a segmented housing defining plural grooves which accept annular seals, a valve stem against which the seals seat and a reversible piston. The reversible piston can be selectively oriented and installed to provide either, manual rest operation to interrupt the supply of the second fluid if the first fluid supply is interrupted, the relay requiring manual resetting to reestablish supply of the second fluid, or automatic reset operation, wherein restoration of the second fluid supply is achieved automatically if the first fluid pressure is re-established subsequent to an interruption.

8 Claims, 2 Drawing Figures

BIMODAL, NON-VENTING PNEUMATIC RELAY

BACKGROUND OF THE INVENTION

1. Field of the Invention

The invention relates generally to pneumatic control devices and more specifically to such devices which sense a first pilot fluid and control the flow of a second, operating fluid.

2. Description of the Prior Art

Pneumatic controls and specifically pneumatic relays are well known in the art. Typical of such pneumatic relays are disclosed in U.S. Pat. No. 4,004,610, entitled "Line Control", issued Jan. 25, 1977, U.S. Pat. No. 3,877,484, entitled "Pneumatic Relay", issued Apr. 15, 1975, and U.S. Pat. No. 4,073,466, entitled "Valve", issued Feb. 14, 1978. Commonly, such devices take the form of a first piston which is acted upon by a control fluid. The piston is linked to a valve structure which controls the supply of a second fluid in response to the pressure condition of the first fluid. Typically, the first, pilot fluid can be at a relatively low pressure, for example, 25 to 30 p.s.i. whereas the second, controlled fluid can be compressed air under several hundred p.s.i. pressure. Structurally, such relays comprise piston means for activation by the pilot supply as well as axially aligned valve components such as for example, a spool valve, which controls supply and termination or venting of the second fluid to associated equipment such as a pneumatic actuator or similar control device.

In many prior art pneumatic relays, the second relatively highly pressurized fluid is controlled by an elongate stem having a plurality of circumferential grooves which receive O-rings seals. Axial translation of the stem and seals selectively closes off or connects various inlet, outlet or vent ports. In such prior art designs, a problem arises in that the repeated sliding passage of O-rings across the edges of radially oriented ports scores and abrades the O-ring seal, interfering with its sealing capability and shortening its life. The problem is especially serious in high pressure applications wherein the substantial pressure differential between one side of an O-ring seal and an exhaust port vent to atmospheric pressure will distort the O-ring seal and further aggravate damage thereto.

A second area of difficulty with prior art pneumatic relays concerns the two operational modes of such devices. In certain applications, it is necessary that once the control fluid or signal has ceased or been interrupted, even temporarily, the pneumatic relay must lock out and remain in a deactivated state until it is manually reset. Applications in control systems, especially those involved with safety devices, wherein a malfunction or shut down must be examined by an operator and a decision made regarding equipment status or startup typically require such an operational mode. The second automatic reset mode of operation of such devices comprehends conventional relay operation wherein momentary interruption or cessation of the control fluid results in a corresponding interruption or cessation of the second controlled fluid. In this mode of operation, reestablishment of the control fluid pressure or flow reestablishes the controlled fluid pressure or flow. Notwithstanding the substantial similarity of these two types of pneumatic relays, prior art relay structures exhibiting these two modes of operation are distinct from one another and require manufacturers, installers and users to provide separate relays exhibiting one or the other mode of operation. This, of course, necessitates dual inventories at all levels of utilization.

Manual reset prior art relays also display an undesirable venting function. When in the deactivated state, and subsequent to the reapplication of control air pressure, prior art relays simply pass the control air to the atmosphere until they are either reset or the control air ceases. Obviously, the quantity of control air so dumped by a plurality of deactivated valves over a period of time can be both substantial and costly.

SUMMARY OF THE INVENTION

A bimodal, non-venting relay according to the instant invention senses the presence or absence of a first pressurized fluid and controls the supply or termination and venting of a second pressurized fluid to associated equipment. The relay includes a piston which is acted upon by the first pressurized fluid. The piston can be selectively and semi-permanently disposed within the housing of the relay in one of two opposite orientations. In one orientation, the relay will provide a lock out mode of operation and in the other opposite orientation, the relay will provide an automatic reset mode of operation.

An elongate stem to which the piston is secured translates axially in response to control fluid pressure and selectively supplies a second pressurized fluid to, or exhausts such fluid from an associated, controlled device. Sealing of the relay stem is achieved by plurality of seals disposed about the stem and positioned within the relay housing. The housing itself comprises a plurality of axially aligned annular segments which can be easily disassembled to facilitate inspection of the seals or the relay stem as well as to change the operational mode of the pneumatic relay from automatic to manual reset or vice versa. The relay may be utilized in a normally open or a normally closed mode without disassembly or modification.

DESCRIPTION OF THE PREFERRED EMBODIMENTS

Figure 1:
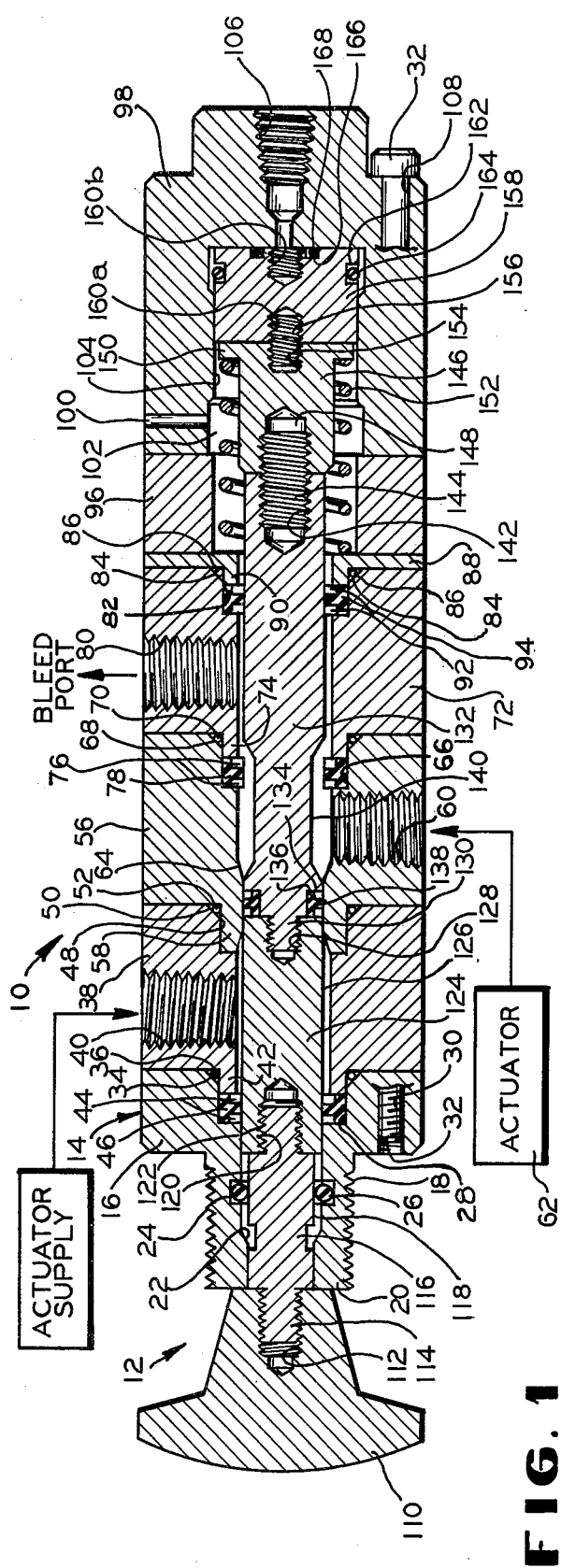
FIG. 1 is a full sectional view of a bimodal pneumatic relay incorporating features of the invention in its deactivated position.

Referring now to FIG. 1, a bimodal pneumatic relay is generally designated by the reference numeral 10. The pneumatic relay 10 comprises an elongate valve spool or stem assembly 12 which is coaxially disposed within an elongate, generally cylindrical segmented housing assembly 14. The housing assembly 14 includes a first cap segment 16 having male threads 18 disposed about a reduced diameter portion 20. In conjunction with a suitable jam nut (not illustrated), the threads 18 of the reduced diameter portion 20 provide convenient panel mounting for the pneumatic relay 10. The first cap segment 16 defines a centrally disposed circular passageway 22 having an annular channel or groove 24 disposed in its surface. The annular groove 24 provides suitable mounting and retention means for an O-ring seal 26. The first cap segment 16 also defines an enlarged diameter portion 28 of the circular passageway 22. The first cap segment 16 includes axially disposed threaded passageways 30 within which appropriately sized elongate threaded fasteners 32 seat. The threaded fasteners 32 maintain the segments of the cylindrical housing assembly 14 in secure, juxtaposed alignment as well as facilitating disassembly and service on the pneumatic relay 10. The first cap segment 16 includes a chamfered or bevelled surface 34 disposed at the intersection of the sidewalls of the enlarged diameter portion 28 of the passageway 22 and the face of the first cap segment 16 opposite the reduced diameter portion 20. The bevelled surface 34 both accepts and provides a seat for an O-ring seal 36. The O-ring seal 36 achieves a circumferential seal between the first cap segment 16 and a second, port segment 38.

The port segment 38 defines a radially disposed threaded passageway 40. The threaded passageway 40 functions as an inlet or supply port and is connected through suitable means (not illustrated) to a source of pressurized air. The threaded supply passageway 40 communicates with the circular passageway 22 which is an aligned continuation of the circular passageway 22 of the first, cap segment 16. The second, port segment 38 includes an annular projection 42 disposed concentrically about the circular passageway 22 which nests within the enlarged diameter portion 28 of the first, cap segment 16 and defines the region wherein a plurality of backup rings 44 and a T-seal 46 are positioned and retained. The second, port segment 38 likewise defines a concentrically disposed enlarged diameter portion 48 of the circular passageway 22.

The second, port segment 38 includes a chamfered or bevelled surface 50 disposed at the intersection of the sidewalls of the enlarged diameter portion 48 of the passageway 22 and the face of the second, port segment 38 opposite the annular projection 42. The bevelled surface 50 both accepts and provides a seat for an O-ring seal 52. The O-ring seal 52 achieves a circumferential seal between the second, port segment 38 and a third, port segment 56.

The third, port segment 56 again defines a continuation of the centrally disposed circular passageway 22. The third, port segment 56 includes an axially extending annular projection 58 which seats within the enlarged diameter portion 48 of the second, port segment 38. Radially disposed in the third, port segment 56 is a threaded passageway 60 which intersects and communicates with the circular passageway 22. The threaded passageway 60 is the outlet port of the relay 10 and, through suitable piping means, is connected to a controlled device such as an actuator 62. The portion of the circular passageway 22 extending through the third, port segment 56 includes a necked or restricted portion 64 defined by the inwardly directed walls of the passageway 22. The port segment 56 also defines a concentrically disposed enlarged diameter portion 66 of the circular passageway 22 adjacent the end of the segment 56 opposite the annular projection 58. A chamfered or bevelled surface 68 disposed at the intersection of the face of the third, port segment 56 opposite the annular projection 58 and the axially extending sidewall of the enlarged diameter portion 66 provides a seat for an O-ring seal 70. The O-ring seal 70 provides a circumferential seal between the third, port segment 56 and a fourth, port segment 72.

The fourth, port segment 72 is a substantial duplicate of the second, port segment 38 and defines an aligned continuation of the centrally disposed circular passageway 22. The fourth, port segment 72 also includes an annular projection 74 extending from one face and concentrically disposed about the circular passageway 22. The annular projection 74 nests within the enlarged diameter portion 66 of the third, port segment 56 and there retains backup rings 76 and a resilient T-seal 78. The fourth, port segment 72 also defines a radially extending threaded passageway 80 which communicates with the circular passageway 22. The threaded passageway 80 is a vent or exhaust port which preferably communicates with the ambient or with the ambient through suitable energy dissipating or noise absorbing means if, as is often the case, the air exhausted through the threaded passageway 80 is under substantial pressure. The fourth, port segment 72 defines a concentrically disposed enlarged diameter portion 82 of the circular passageway 22. The port segment 72 also defines a chamfered or bevelled surface 84 disposed at the innersection of the sidewalls of the enlarged diameter portion 82 and the face of the port segment 72 opposite the annular projection 74. The bevelled surface 84 both accepts and provides a seat for an O-ring seal 86. The O-ring seal 86 achieves a circumferential seal between the fourth, port segment 72 and a washer 88. The washer 88 includes an annular shoulder or projection 90 which seats within the enlarged diameter portion 82 of the fourth, port segment 72 and there retains backup rings 92 and a resilient T-seal 94. Adjacent the washer 88 is disposed an annular spacer 96. The axial length of the annular spacer 96 may be chosen to complement the axial length of the other components of the pneumatic relay 10 to be described subsequently.

The segmented cylindrical housing assembly 14 includes a sixth, end segment 98. The end segment 98 includes a small, radially extending vent passageway 100 which provides communication between a chamber 102 defined by and disposed concentrically within the sixth, end segment 98 and the ambient. The inner surface of the sixth, end segment 98 which defines the chamber 102 includes an inwardly stepped, reduced diameter region 104. The reduced diameter region 104 is disposed generally centrally along the inner surface of the sixth, end segment 98 defining the chamber 102. The sixth, end segment 98 also defines an axially extending threaded passageway 106. The threaded passageway 106 defines an inlet for the control fluid and is thus connected by suitable piping means (not illustrated) to the source of control fluid. The end segment 98 as well as the other segments 38, 56, 72, and 96 and the washer 88 define aligned axial passageways 108 through which the threaded fasteners 32 pass.

The valve spool or stem assembly 12 first of all includes a control knob 110 which defines an internal threaded passageway 112 which receives a complementarily threaded extension 114 which forms a portion of a first spool member 116. The spool member 116 includes an outer cylindrical surface 118 circumferentially and sealingly engaged by the O-ring seal 26. First spool member 116 further includes a second threaded extension 120 disposed oppositely from the threaded extension 114. The second threaded extension 120 is seated within a complementary first blind threaded opening 122 disposed within a second, coaxially aligned spool member 124 which includes an outer cylindrical surface 126 which is sealingly engaged by the T-seal 46. The second spool member 124 further defines a second, coaxial blind threaded opening 128 within which is secured a complementarily threaded extension 130 which forms a portion of a third, coaxially aligned spool member 132. A portion of the third spool member 132 most proximate the second spool member 124 defines an annular groove 134 within which is seated a pair of backup rings 136 and a resilient T-seal 138. The third spool member 132 also defines a necked down or reduced diameter portion 140 disposed generally proximate the just described T-seal 138. The third spool member 132 also defines a blind threaded coaxially disposed opening 142 which receives a complementarily threaded connecting stud 144. A fourth, spring mounting spool member 146 is coaxially aligned with the other spool members and defines a centrally disposed blind threaded opening 148. The connecting stud 144 seats within the threaded blind opening 148 and secures the fourth spool member 146 to the third spool member 132. The spring mounting fourth spool member 146 includes a radially extending lip 150. Compression spring 152 is disposed within the chamber 102 and seated between the radially extending lip 150 of the fourth spool member 146 and the exposed face of the washer 88. The compression spring 152 thus provides a biasing or restoring force to the spool assembly 12 directed to the right as viewed in FIG. 1. The fourth spool member 146 also defines a coaxially disposed blind threaded opening 154. A portion of a complementarily threaded connecting stud 156 is disposed within the blind threaded opening 154. A fifth spool member or piston 158 is coaxially aligned with and disposed adjacent the fourth spool member 146. The piston 158 defines a pair of threaded openings 160a and 160b. Both of the threaded openings 160a and 160b include threads complementary to those of the connecting stud 156 and the piston 158 may be secured to the fourth spool member 146 by engagement therewith. The piston 158 further defines a peripheral annular groove 162 within which is seated in O-ring seal 164. Disposed on one face of the piston 158 is a second annular groove 166 within which is also seated a resilient O-ring seal 168.

Operation of the pneumatic relay 10 will now be described, first with reference to FIG. 1 and then with reference to FIG. 2. In FIG. 1, the pneumatic relay 10 is shown in its relaxed, deactivated state. Note that the threaded vent passageway 80 is in communication with the threaded passageway 60 leading to the controlled device such that pressurized fluid therefrom is exhausted to the atmosphere whereas the threaded supply passageway 40 is closed off by the T-seals 46 and 138. The first mode of operation to be described is the lock out or manual reset mode of operation and the piston 158 is secured to the remainder of the spool assembly 12 in the orientation which provides such operation.

Figure 2:
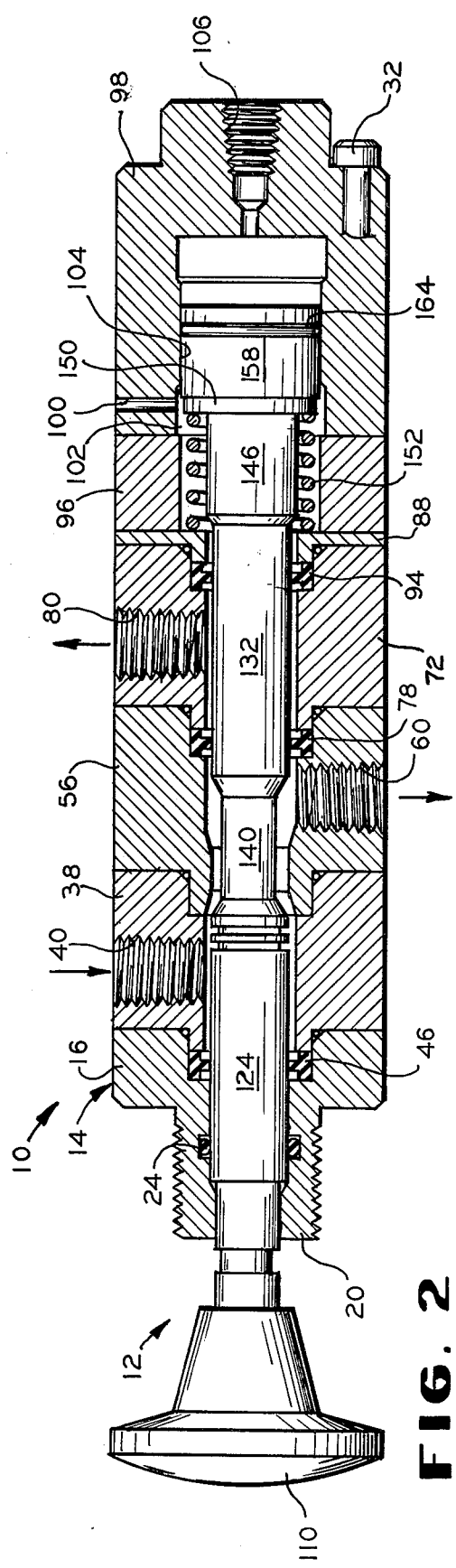
FIG. 2 is a full sectional view of a bimodal pneumatic relay incorporating features of the invention in its activated position.

Referring now to FIG. 2, the pneumatic relay 10 has been manually activated by pulling on the knob 110 to translate the stem assembly 12 to its fully extended, leftmost position. The supply passageway 40 is now in communication with the passageway 60 which leads to the control device such as the actuator 62 whereas the threaded vent passageway 80 is sealed off by the T-seals 78 and 94. The pneumatic relay 10 will maintain this operating condition and the stem assembly 12 will remain in this position until the supply of pressurized control fluid operating upon the face of the piston 158 is less than that force exhibited by the compression spring 152. As this pressure reduction or total cessation of pressure occurs, the stem assembly 12 translates toward the end segment 98, i.e., to the left in FIGS. 1 and 2, until the O-ring seal 164 of the piston 158 loses contact and thus seal with the walls of the reduced diameter region 104. As seal is lost, the pressure against the piston 158 and thus the force generated thereby drops to zero and the stem assembly 12 returns to the position illustrated in FIG. 1.

Two structural features which significantly influence operation of the pneumatic relay 10 in this operational state should be noted. First of all, it is apparent that since the O-ring seal 164 is not in contact with the wall of the chamber 102, no seal is provided, thus precluding the possibility of a pressure build up against the piston 158 and production of a force which either restores or maintains the stem assembly 12 in its left, activated position. Secondly, the O-ring seal 168 in the face of the piston 158 seals against the end wall of the chamber 102 and prevents flow of pressurized control fluid into the chamber 102 notwithstanding that the pressure of the control fluid may have been re-established. The O-ring seal 168 thus effectively prevents the continuous venting of control fluid through the chamber 102 and out the vent passageway 100. Of course, even without the O-ring seal 168, if control fluid pressure were reestablished, the absence of a seal between the piston 158 and the walls of the chamber 102 precludes reactivation of the pneumatic relay 10 as previously described. Furthermore, the area of the piston 158 within the O-ring seal 168 to which the control fluid is applied is small enough that insufficient force is generated to overcome the spring rate and preload of the compression spring 152 and cause axial translation to the stem assembly 12, loss of seal between the O-ring seal 168 and the end of the chamber 102 and thus reactivation of the pneumatic relay 10.

In the second mode of operation, namely, the automatic reset mode of operation, the piston 158 is oriented oppositely from its disposition shown in FIGS. 1 and 2. To achieve this reversed disposition, the piston 158 must be dismounted from the spring retaining fourth spool member 146, rotated end for end and reinstalled with the O-ring seal 168 adjacent the spool member 146. The O-ring seal 164 is now in constant contact with and provides a positive seal against the reduced diameter region 104 of the walls of the chamber 102. By virtue of this positive seal, application of pressurized control fluid to the face of the piston 158 causes the stem assembly 12 to translate from the position illustrated in FIG. 1 to the position illustrated in FIG. 2 whenever the pressure and thus the force exerted against the piston 158 is of sufficient magnitude to overcome the oppositely directed biasing force provided by the compression spring 152. As previously described, the translation of the stem assembly 12 from the position illustrated in FIG. 1 to that illustrated in FIG. 2 interrupts communication through the circular passageway 22 between the threaded passageway 60 leading to the control device and the exhaust passageway 80 and establishes communication between the passageway 60 and the supply passageway 40. If the pressure of the control fluid applied to the face of the piston 158 drops below that magnitude required to produce a force offsetting that of the compression spring 152, the stem assembly 12 will return to that position illustrated in FIG. 1 and exhaust the pressurized fluid previously supplied to the control device through the exhaust passageway 80. In contradistinction to the manual reset mode described above, it should be appreciated that the O-ring seal 164 maintains a positive seal against the reduced diameter region 104 of the walls of the chamber 102 and thus when the pressure of the control fluid rises sufficiently to produce force which overcomes that provided by the compression spring 152, the stem assembly 12 will again return to the position illustrated in FIG. 2. Note that in the automatic reset mode of operation, the consideration of venting or not venting the control fluid through the vent passageway 100 does not apply inasmuch as the seal between the piston 158 and the walls of the chamber 102 is positive and constant.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A pneumatic control device comprising: a housing including a plurality of aligned, juxtaposed segments defining a centrally disposed bore, a fluid supply passageway, a fluid delivery passageway, a fluid exhaust passageway and a control fluid passageway in communication with said bore; a valve stem disposed within said central bore and translatable between a first position and a second position; means for biasing said valve stem toward said first position; a plurality of annular seals mounted on said housing and disposed about said valve stem; and means for retaining said seals in said housing including a like plurality of channels disposed in the walls of said centrally disposed bore wherein at least one of said channels is defined by a concentrically disposed enlarged diameter portion of said bore in one of said segments and an annulus projecting from the face of an adjacent one of said segments and nesting within said enlarged diameter portion.

2. The pneumatic control device of claim 1 further including an annular seal disposed in and translating with said valve stem.

3. The pneumatic control device of claim 1 further including a reversible piston disposed within said bore and selectively operably securable to said valve stem in one of two opposed orientations, said piston and said bore including seal means for providing a seal between said piston and said bore between said first position and said second position of said valve stem in one of said piston orientations and for providing a seal between said piston and said bore between a point between said first and said second positions of said valve stem and said second position of said valve stem in the other of said piston orientations.

4. The pneumatic control device of claim 3 further including seal means disposed on a face of said piston for sealing of said control fluid passageway when said piston is secured to said control stem in said other of said orientations.

5. The pneumatic control device of claim 3 further including means disposed about said valve stem for providing circumferential seals between said stem and said bore.

6. The pneumatic control device of claim 3 wherein said seal means includes a resilient seal disposed about the periphery of said piston at an axial location more proximate one face of said piston than the other face of said piston.

7. A pneumatic relay comprising: a housing including a plurality of aligned, juxtaposed segments defining a centrally disposed bore and a fluid supply passageway, a fluid delivery passageway, a fluid exhaust passageway and a control fluid passageway in communication with said bore; an elongate valve stem disposed within said central bore and axially translatable between a first position and a second position; a reversible piston disposed within said bore and selectively operably securable to said valve stem in one of two opposed orientations, said piston and said bore including seal means for providing a seal between said piston and said bore between said first position and said second position of said valve stem in one of said piston orientations and for providing a seal between said piston and said bore between a point between said first and said second positions of said valve stem and said second position of said valve stem in the other of said piston orientations; spring means for biasing said valve stem toward said first position; a plurality of annular seals mounted on said housing and disposed about said valve stem; and means for retaining said seals in said housing including a like plurality of channels disposed in the walls of said centrally disposed bore wherein at least one of said channels is defined by an enlarged portion of said bore in one of said segments and a projection on the face of the adjacent one of said segments which nests within said enlarged portion.

8. The pneumatic relay of claim 7 further including seal means disposed on a face of said piston for sealing of said control fluid passageway when said piston is secured to said control stem in said other of said orientations.

* * * * *